United States Patent
Cho et al.

(10) Patent No.: US 8,681,734 B2
(45) Date of Patent: Mar. 25, 2014

(54) METHOD FOR TRANSMITTING A RANGING SIGNAL IN A WIRELESS COMMUNICATION SYSTEM

(75) Inventors: Han Gyu Cho, Anyang-si (KR); Jin Sam Kwak, Anyang-si (KR); Hyun Woo Lee, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 13/382,475

(22) PCT Filed: Jul. 12, 2010

(86) PCT No.: PCT/KR2010/004505
§ 371 (c)(1),
(2), (4) Date: Jan. 5, 2012

(87) PCT Pub. No.: WO2011/007987
PCT Pub. Date: Jan. 20, 2011

(65) Prior Publication Data
US 2012/0113955 A1 May 10, 2012

Related U.S. Application Data

(60) Provisional application No. 61/224,915, filed on Jul. 13, 2009, provisional application No. 61/225,570, filed on Jul. 15, 2009, provisional application No. 61/225,888, filed on Jul. 15, 2009.

(51) Int. Cl.
*H04W 72/04* (2009.01)
(52) U.S. Cl.
USPC ........... 370/330; 370/203; 370/252; 370/328; 370/329; 370/331; 455/422.1; 455/436; 455/450

(58) Field of Classification Search
USPC ......... 370/203, 208, 252, 312, 328, 329, 330, 370/331, 337; 455/422.1, 436, 450, 452.1
See application file for complete search history.

(56) References Cited

U.S. PATENT DOCUMENTS

2005/0243940 A1* 11/2005 Huh et al. ............... 375/260
2006/0062196 A1    3/2006 Cai et al.
(Continued)

FOREIGN PATENT DOCUMENTS

CN    101267679 A  *  9/2008
EP    2278847 A1  *  1/2011
(Continued)

OTHER PUBLICATIONS

HyunWoo Lee, Jin Sam Kwak, HanGyu Cho, Young-Hyoun Kwon, Sungho Moon; Proposed AWD Text on the Ranging Configurations for Non-synchronized AMSs; Apr. 27, 2009; IEEE 802.16 Broadband Wireless Access Working Group; whole document.*
Cheng et al. "A study on cell search algorithms for IEEE 802.16e OFDMA Systems", WCNC 2007 proceedings, IEEE, Mar. 11-15, 2007.

*Primary Examiner* — Andrew Chriss
*Assistant Examiner* — Jose Perez
(74) *Attorney, Agent, or Firm* — McKenna Long & Aldridge LLP

(57) ABSTRACT

The present invention relates to a method in which a terminal transmits a ranging signal in a wireless communication system. The method comprises a step of acquiring cell identification information using the preamble received from a base station, a step of determining frequency resource allocation information using the cell identification information and information on the number of allocated subbands, and a step of transmitting a ranging signal using the sub-band indicated by the frequency resource allocation information.

8 Claims, 8 Drawing Sheets

(56) References Cited

U.S. PATENT DOCUMENTS

2006/0098749 A1* 5/2006 Sung et al. .................... 375/260
2007/0058523 A1* 3/2007 Cho et al. ...................... 370/208

FOREIGN PATENT DOCUMENTS

KR  10-2006-0055864  5/2006
KR  10-2008-0028768  4/2008

* cited by examiner

METHOD FOR TRANSMITTING A RANGING SIGNAL IN A WIRELESS COMMUNICATION SYSTEM

This application is a 35 U.S.C. §371 National Stage entry of International Application No. PCT/KR2010/004505, filed on Jul. 12, 2010, and claims the benefit of priority of US Provisional application Nos. 61/224,915 filed Jul. 13, 2009, 61/225,570 filed Jul. 15, 2009, and 61/225,888 filed Jul. 15, 2009, all of which are incorporated by reference in their entirety herein.

TECHNICAL FIELD

The present invention relates to a mobile communications system, and more particularly, to a method for transmitting a ranging signal in a mobile communication system.

BACKGROUND ART

The main standard defined by the IEEE 802.16 task group includes IEEE 802.16-2004 called fixed WiMAX and IEEE 802.16e-2005 (16e) called mobile WiMAX. The IEEE 802.16e-2005 has been finally approved from the IEEE on December of 2005 as the standard. The standard based on mobile WiMAX of a current version includes IEEE 802.16-2004, IEEE 802.16e-2005 (this document includes Corrigenda of IEEE 802.16-2004), and IEEE 802.16-2004/Corrigenda2/D4. Currently, standardization of IEEE 802.16m (16m) for mobile WiMAX of next version is in progress by TGm within the IEEE 802.16 task group.

In the IEEE 802.16e, a ranging procedure is used for various purposes of use. In more detail, the ranging procedure is used for four purposes of use as follows: initial ranging, handover ranging, periodic ranging and bandwidth request ranging. The initial ranging is used for uplink time synchronization (that is, time and frequency synchronization) if a user equipment tries to initially enter a network. The handover ranging is used for initial synchronization with a target base station if access is changed from a source base station to the target base station. The periodic ranging is used to update uplink synchronization periodically. The bandwidth request ranging is used to allow a user equipment to request a base station of uplink resources.

DISCLOSURE

Technical Problem

Accordingly, the present invention has been devised to obviate one or more problems due to limitations and disadvantages of the related art, and an object of the present invention is to provide a method for configuring a ranging channel efficiently.

Another object of the present invention is to provide a method for configuring a ranging structure that minimizes inter-cell interference.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting a ranging signal from a user equipment in a wireless communication system comprises the steps of acquiring cell identification information by using a preamble received from a base station; determining frequency resource allocation information by using the cell identification information and information on the number of allocated subbands; and transmitting a ranging signal by using the subband indicated by the frequency resource allocation information.

The frequency resource allocation information according to one embodiment of the present invention index includes information on the subband used for transmission of the ranging signal.

In this case, index of the subband may be determined using the following Equation:

<Equation>

$$I_{SB} = \mathrm{mod}(\mathrm{CellID}, K_{SB}),$$

in the above Equation, $I_{SB}$ represents index of subband to which a ranging channel resource is allocated, CellID represents identification information of a cell to which the user equipment belongs, and $K_{SB}$ represents a total number of subbands allocated to the user equipment.

The method according to one embodiment of the present invention may further comprise the step of receiving information on a subframe for transmitting the ranging signal from the base station through a super frame header.

Also, the method according to one embodiment of the present invention may further comprise the step of configuring time resource allocation information by using the cell identification information, information on the number of ranging channels allocated per subframe and information on the number of time resource units of at least one of super frame, frame, and subframe.

At this time, the time resource allocation information may be index information on the subframe for transmitting the ranging signal.

Also, index of the subframe may be determined using the following Equation:

<Equation>

$$I_{SF} = \mathrm{mod}(f(\mathrm{CellID}), n_{SF} * n_F / N\_RCH)$$

In the above Equation, ISF represents index of subframe to which ranging channel resources are allocated, nSF represents the number of subframes constituting one frame, nF represents the number of frames constituting one super frame, N_RCH represents the number of ranging channels allocated per subframe, and mod(A, B) represents a modulo function that means the remainder obtained by dividing A by B.

To achieve these objects and other advantages and in accordance with the purpose of the invention, according to another aspect of the present invention, a user equipment in a wireless communication system comprises a Tx module for transmitting a radio signal; an Rx module for receiving the radio signal; and a processor acquiring cell identification information by using a preamble received from a base station through the Rx module and determining frequency resource allocation information by using the cell identification information and information on the number of allocated subbands, wherein the user equipment transmits a ranging signal by using the subband indicated by the frequency resource allocation information through the Tx module.

The aforementioned embodiments of the present invention are only a part of the preferred embodiments of the present invention, and various embodiments in which technical features of the present invention are reflected may be devised and understood based on the detailed description of the present invention, which will be described later, by the person with ordinary skill in the art.

Advantageous Effects

According to the embodiments of the present invention, as the ranging channel is configured using identification information (cell ID) of each cell, signaling overhead for configuration of a separate ranging channel can be reduced and a ranging procedure can be performed efficiently.

Also, according to the embodiments of the present invention, since a plurality of user equipments located within a plurality of cell regions where a base station provides a service determine a resource region, to which a ranging channel is allocated, are identified using separate cell ID, the user equipments located within different cells use their respective resource regions different from one another, whereby inter-cell interference can be reduced during ranging signal transmission.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to an OFDMA system.

In the present invention, ranging channel duration, ranging subcarrier spacing, ranging bandwidth, ranging code type/length, use of zero-correlation region (cyclic shift for increasing opportunity (number of available codes)), purpose of use of ranging channels (initial ranging channel, periodic ranging channel, handover ranging channel, bandwidth request ranging channel, etc.), and a frequency use method (localized allocation, distributed allocation, sub-band, grouping, etc.) of a ranging channel are only exemplary and do not restrict the present invention.

In this specification, it is assumed that a ranging channel is based on an OFDMA data structure. In other words, it is assumed that the ranging channel has the same subcarrier spacing as that of data and processing such as FFT is performed in a data useful symbol time unit. However, the aforementioned assumption is drafted for the reason of convenience and does not restrict the present invention even though the ranging channel is configured separately from the OFDAM data structure. In other words, the ranging channel may be configured to have subcarrier spacing different from that of data. In this case, a portion corresponding to one code in the ranging channel may be longer than useful symbol time of data in a time domain.

The present invention relates to a configuration of ranging or format. In the present invention, ranging structure, ranging channel duration, ranging subcarrier spacing, ranging bandwidth, ranging code type/length, use of zero-correlation region (cyclic shift for increasing opportunity (number of available codes)), purpose of use of ranging channels (initial ranging channel, periodic ranging channel, handover ranging channel, bandwidth request ranging channel, etc.), and a frequency use method (localized allocation, distributed allocation, sub-band, grouping, etc.) of a ranging channel are only exemplary and do not restrict the present invention.

Hereinafter, a case where the embodiment of the present invention is applied to IEEE 802.16m will be described in detail with reference to the drawings. The IEEE 802.16m is disclosed as an example of a system that uses OFDMA modulation mode, and the present invention is not restricted by the IEEE 802.16m.

Figure 1:
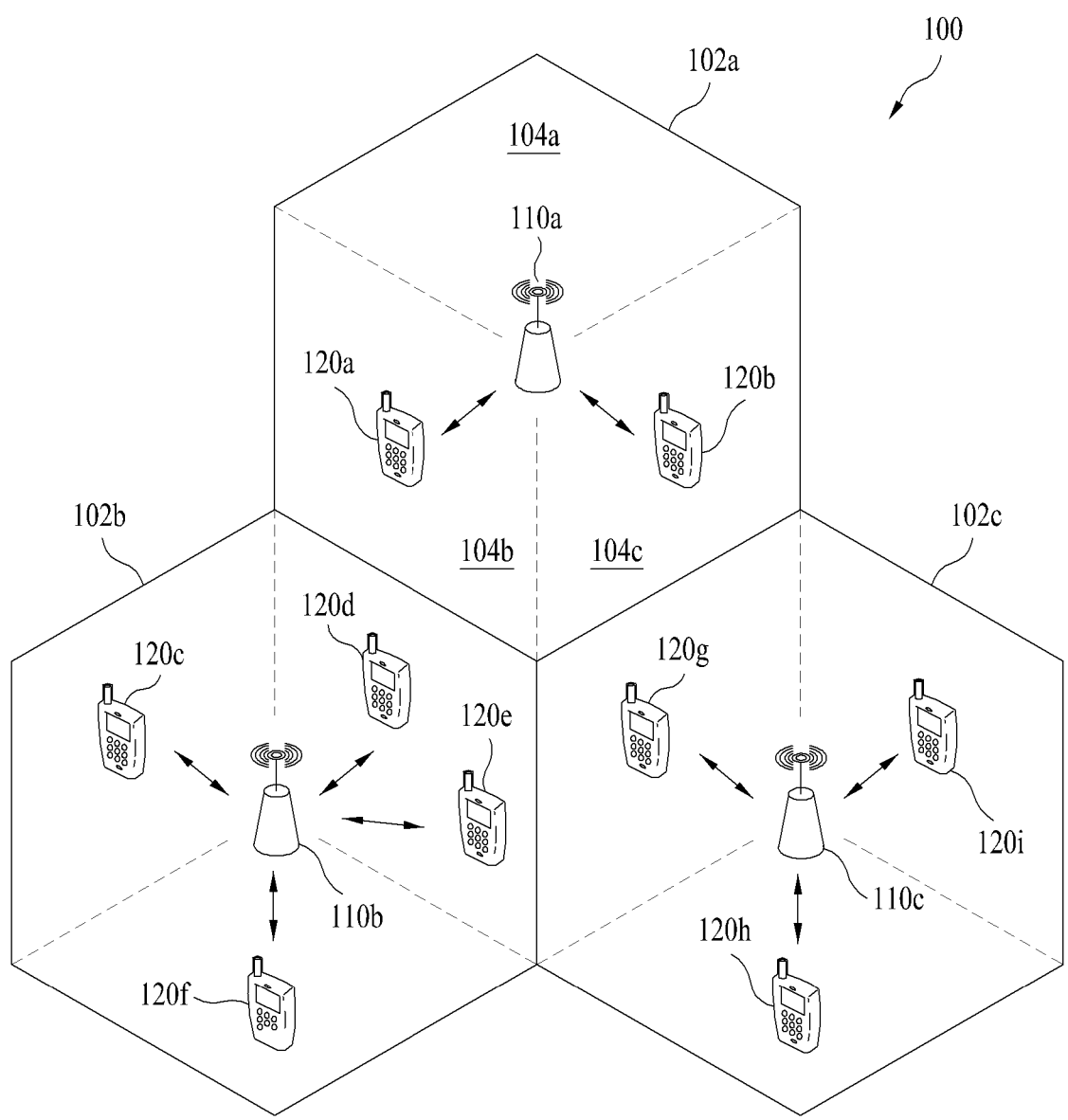
FIG. 1 is a diagram illustrating an example of a wireless communication system.

FIG. 1 is a diagram illustrating a wireless communication system.

Referring to FIG. 1, a wireless communication system 100 includes a plurality of base stations 110 and a plurality of user equipments 120. The wireless communication system 100 may include a homogeneous network or a heterogeneous network. In this case, the heterogeneous network refers to a network where different network entities, such as a macro cell, a femto cell, a pico cell, and a relay station, coexit. Generally, the base station is a fixed station that performs communication with a user equipment. Each of the base stations 110a, 110b, and 110c provides a service to specific localized regions 102a, 102b, and 102c. In order to improve system throughput, the specific regions may be divided into a plurality of smaller regions 104a, 104b and 104c. Each of the smaller regions may be referred to as a cell, sector or segment. In case of the IEEE 802.16 system, cell identity (cell_ID or IDCell) is given based on the whole system. On the other hand, sector or segment identity is given based on the specific region where each base station provides a service, and has a value of 0 to 2. The user equipments 120 may generally be distributed, fixed or moved in the wireless communication system. Each of the user equipments may perform communication with one or more base stations through an uplink (UL) and a downlink (DL) at a random time. The base station and the user equipment may perform communication with each other by using FDMA (Frequency Division Multiple Access), TDMA (Time Division Multiple Access), CDMA (Code Division Multiple Access), SC-FDMA (Single Carrier-FDMA), MC-FDMA (Multi Carrier-FDMA), OFDMA (Orthogonal Frequency Division Multiple Access) or their combination. In this specification, the uplink means a communication link from the user equipment to the base station while the downlink means a communication link from the base station to the user equipment.

Figure 2:
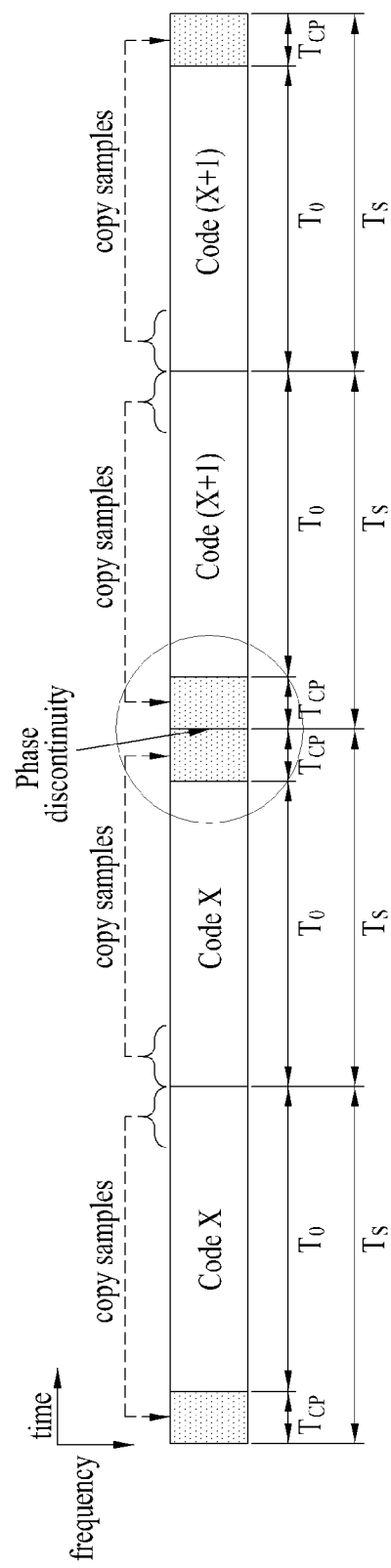
FIG. 2 is a diagram illustrating a structure of a ranging channel of IEEE 802.16e.

FIG. 2 is a diagram illustrating a structure of a ranging channel of IEEE 802.16e. The structure of the ranging channel is used to transmit a ranging signal, and is based on an OFDMA structure for data. In FIG. 2, $T_{CP}$ represents a length of cyclic prefix, $T_0$ represents useful symbol time, and $T_{-S}$ represents OFDMA symbol duration. Since the OFDMA symbols are configured by cyclic prefix and useful symbols, $T_S = T_{CP} + T_0$ is obtained.

Referring to FIG. 2, the structure of the ranging channel has two repeated structures, each of which includes two OFDMA symbols. The first OFDMA symbol includes copy sample and preamble, and the second OFDMA symbol includes preamble and copy sample. The copy sample included in the first and second OFDMA symbols is derived from the preamble and given to ensure phase continuity with the preamble. The copy sample may be referred to as cyclic prefix (CP) or cyclic postfix (CP) depending on position. In FIG. 2, the copy sample within the first OFDMA symbol may be referred to as cyclic prefix, and the copy sample within the second OFDMA symbol may be referred to as cyclic postfix. In this specification, cyclic prefix or cyclic region will simply be used to refer to the copy sample, cyclic prefix, and cyclic postfix.

In case of the first and second OFDMA symbols, a code X of a length of 144 is mapped into 144 subcarriers in a frequency domain. After inverse fast fourier transform (IFFT) OFDMA modulation, cyclic prefix is given to the first symbol in the same manner as the data OFDMA structure. In order to ensure phase continuity between the first and second OFDMA symbols, a portion of code X is first given to the second symbol and copy sample is then added in a type of cyclic postfix in a time domain. In this case, cyclic prefix and cyclic postfix have the same length as each other, wherein the same length as OFDMA data CP is used. In this way, the ranging channel is generated based on the same structure as that of OFDMA data. Third and fourth OFDMA symbols are generated using code X+1 in the same manner as the first and second OFDMA symbols. At this time, phase discontinuity occurs at the edge between the second and third OFDMA symbols. If a portion corresponding to phase discontinuity enters a detection window of the base station, detection performance is degraded due to inter-subcarrier interference.

Supposing that the user equipment which is not synchronized with the base station uses the ranging channel structure illustrated in FIG. 1, if time delay of the ranging signal is longer than a length of data CP, all the portions may not be used during detection at the base station. In other words, since first and third codes among the codes of four portions illustrated in FIG. 2 are used for virtual ranging cyclic prefix, they are not used at a detection terminal. Accordingly, only second and fourth codes may be used for detection by the base station. In this case, in the ranging structure of FIG. 2, the portion, which is not actually used by the base station, has too great overhead. Actually, the time length of the first and third codes is required to correspond to sum of maximum round trip delay that may actually occur within a cell and maximum delay spread. However, in the ranging channel of FIG. 2, since the time length of each code depends on useful symbol time of data, a length of virtual ranging CP (portions corresponding to the first and third codes) located at the center of the ranging channel is set to be too long.

In case of the IEEE 802.16m, performance should be optimized within the range of 5 km cell radius, and should be degraded a little within the range of 30 km cell radius. Also, functionality should be ensured within the range of 100 km cell radius. Accordingly, ranging channel configuration or format for supporting various situations is required. Each ranging channel constituting ranging channel configuration or format may be configured by combination of ranging cyclic prefix (RCP), ranging preamble (RP), and guard time (GT). In this case, it may be considered that the respective portions have their respective lengths different from one another depending on a supportable cell radius. However, if ranging configuration or format increases, complexity of the base station and the user equipment may be increased due to signaling overhead increase based on increase of necessary signaling bits.

Accordingly, a design of ranging (channel) configuration or format that can minimize complexity of the base station and the user equipment through a small number of signaling bits is required.

Figure 3:
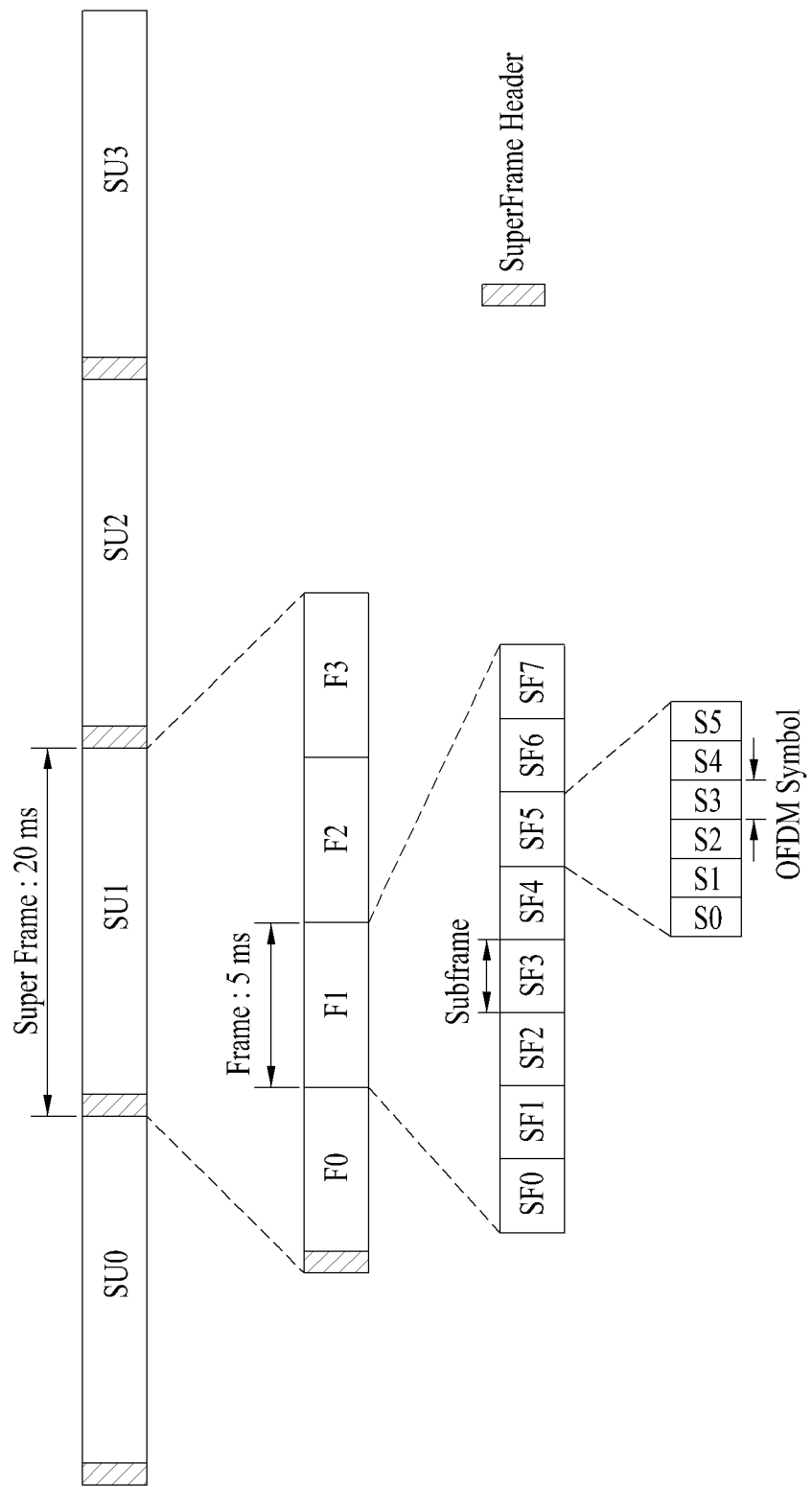
FIG. 3 is a diagram illustrating a structure of a basic frame used in IEEE 802.16m.

FIG. 3 is a diagram illustrating a structure of a basic frame used in IEEE 802.16m. The structure of the basic frame may be applied to Frequency Division Duplex (FDD), Half Frequency Division Duplex (H-FDD), and Time Division Duplex (TDD).

Referring to FIG. 3, the structure of the basic frame includes super frames SU0 to SU3 of 20 ms, which support a bandwidth of 5 MHz, 8.75 MHz, 10 MHz, or 20 MHz. Each of the super frames is divided into four frames F0 to F3 of 5 ms having the same size, and starts with a super frame header (SFH). Each of the frames includes eight subframes SF0 to SF7. The subframes are allocated for downlink or uplink transmission. Three types of subframes exist depending on a type of cyclic prefix (CP). For example, the subframe may include 5, 6 or 7 OFDMA symbols. The OFDMA symbols are configured by cyclic prefix and useful symbols. The cyclic prefix is generally coped from the end of a useful symbol and added to the front of the useful symbol. For this reasons, phase is continued between the cyclic prefix and the useful symbol. The useful symbol time has various values depending on a system profile such as the number of points used for DFT and system bandwidth.

Table 1 illustrates a part of IEEE 802.16m OFDMA parameters defined in the system profile. The following OFDMA parameters are defined based on data. In this specification, OFDMA symbols refer to OFDMA symbols for data, and CP and useful symbol time are based on OFDMA symbol structure for data, unless mentioned specifically.

TABLE 1

| Nominal Channel Bandwidth (MHz) | 5 | 7 | 8.75 | 10 | 20 |
|---|---|---|---|---|---|
| Over-sampling Factor | 28/25 | 8/7 | 8/7 | 28/25 | 28/25 |
| Sampling Frequency (MHz) | 5.6 | 8 | 10 | 11.2 | 22.4 |

TABLE 1-continued

| Nominal Channel Bandwidth (MHz) | 5 | 7 | 8.75 | 10 | 20 |
|---|---|---|---|---|---|
| FFT Size | 512 | 1024 | 1024 | 1024 | 2048 |
| Sub-Carrier Spacing (kHz) | 10.937500 | 7.812500 | 9.765625 | 10.937500 | 10.937500 |
| Useful Symbol Time $T_n$ (µs) | 91.429 | 128 | 102.4 | 91.429 | 91.429 |

Subcarrier spacing and useful symbol time are in a relation of an inverse number. Cyclic prefix may be set in various manners depending on a size copied from a useful symbol. For example, a length of cyclic prefix may be set to $\frac{1}{4} \times T_u$, $\frac{1}{8} \times T_u$, or $\frac{1}{16} \times T_u$. Since the OFDMA symbols are configured by cyclic prefix and useful symbols, their length is determined by sum of the length of cyclic prefix and useful symbol time. In the OFDMA symbol structure for data, the symbol length is referred to as $T_S$, the length of cyclic prefix is referred to as $T_{CP}$, and the length of the useful symbol is referred to as $T_u$ or $T_o$.

In order to describe the ranging channel structure separately the OFDMA symbol structure for data, cyclic prefix and preamble included in the ranging channel structure are referred to as ranging cyclic prefix (RCP) and ranging preamble (RP), respectively. The RCP and the RP may be set to have the same structure as that of CP and useful symbol, or may be set to have a structure different from that of CP and useful symbol. In order to indicate that the RCP and the RP have the same structure as that of CP and useful symbol, ranging cyclic prefix may simply be represented by cyclic prefix (CP) and its length may be referred to as $T_{CP}$, and the length of ranging preamble may be referred to as $T_o$. In other cases, the length of ranging cyclic prefix is referred to as $T_{RangingCP}$, the length of ranging preamble is referred to as $T_{RP}$, and the length of ranging guard time is referred to as $T_{RangingGT}$.

In all the accompanying drawings, a horizontal axis represents a time domain, and a vertical axis represents a frequency domain. The frequency domain may be represented by physical subcarriers or logical subcarriers. Also, a specific frequency domain within a ranging region may be allocated to a guard band (or guard frequency) for avoiding subcarrier interference with a neighboring channel and may not be used for actual transmission. For example, a part of both ends of the frequency domain of the ranging channel may be allocated to a guard band and may not be used for actual transmission.

Also, $P(Code\ X_w)_k$ represents code (or sequence) used for preamble. In this case, P(Code X) means the Xth preamble code selected from a ranging code set. The ranging code set may be a Pseudo random Noise (PN) code set, a Constant Amplitude Zero Auto-Correlation (CAZAC) sequence set, a Zadoff-Chu (ZC) sequence set, a Generalized Chirp-Like (GCL) sequence set or their random combination. $X_w$ means the wth value of the Xth ranging code, and w may have a value of 0~($N_{code}$−1). In the drawings, $X_w$ is expressed for the reason of convenience, and this expression does not mean that only one value is included in the preamble. $X_w$ ($0 \leq w \leq N_{code}-1$) values for the length of all the ranging codes are all mapped into the preamble. 'k' represents a physical or logical index of subcarrier into which Code $X_w$ is mapped, and its value is greater (longer) than the value of w. Subcarriers into which preamble code is not mapped have NULL (=0) values.

In the IEEE 802.16e, the ranging channel has been configured based on the data OFDMA symbol structure. In other words, the time length of the RCP is set in the same manner as that of data CP ($T_{CP}$), and the time length of the RP is set in the same manner as that of data useful symbol time ($T_0$).

Figure 4:
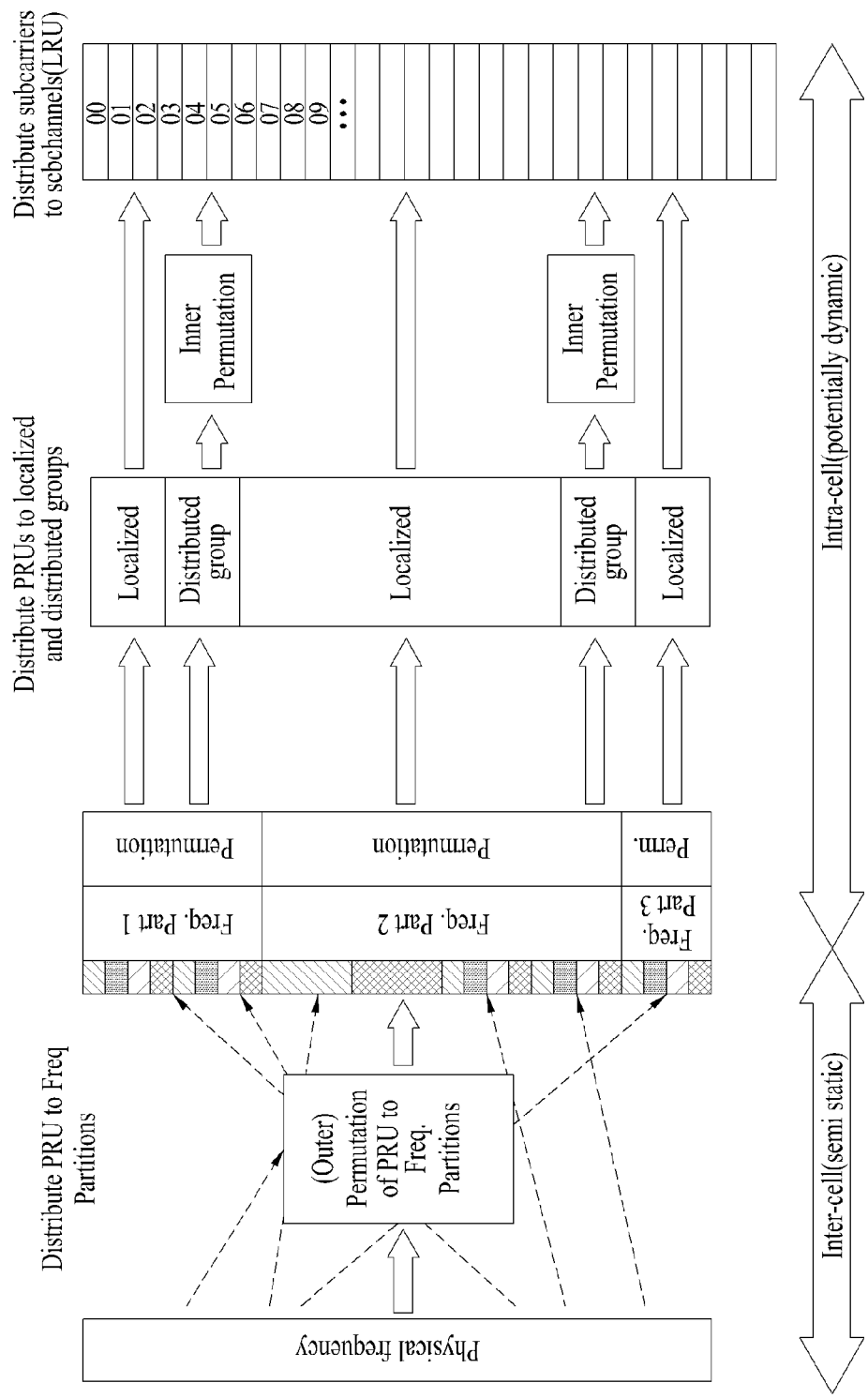
FIG. 4 is a diagram illustrating a procedure of mapping a resource unit.

FIG. 4 is a diagram illustrating a procedure of mapping a resource unit.

Referring to FIG. 4, outer permutation may be performed for physical frequency resources. Outer permutation is applied in a unit of at least one PRU. Outer permutation may be performed in a unit of N1 or N2 PRUs (N1>N2), wherein N1 and N2 may be varied depending on a bandwidth. However, for efficient outer permutation, N1 should be an integer multiple of N2. Outer permutation may mean a procedure of dividing PRU into subband (SB) PRU (hereinafter, referred to as 'PRUSB') and miniband (MB) PRU (hereinafter, referred to as 'PRUMB') and performing permutation of a PRU unit for the miniband PRU in the same manner as subband division and miniband permutation. The PRUSB is the PRU which will be allocated to the subband, and the PRUMB is the PRU which will be allocated to the miniband. In the above procedure, N1 represents the number of PRUs included in the subband, and N2 represents the number of PRUs included in the miniband.

Next, the rearranged PRUs are distributed into frequency partitions. Each of the frequency partitions is divided into a logical CRU (LCRU) and a logical DRU (LDRU). Sector specific permutation may be supported, and direct mapping of resources may be supported for continuous resources. The size of distributed/continuous resources may flexibly be set per sector.

Next, continuous groups and distributive groups are mapped into LRU. Inner permutation defined for distributive resource allocation spread subcarriers into all the distributed resources. There is no inner permutation for continuous resource allocation. PRU is directly mapped into a continuous resource unit within each of the frequency partitions.

In the mean time, a fractional frequency reuse (FFR) scheme may be used. The FFR scheme is to divide the entire frequency domain into a plurality of frequency partitions (FP) and allocate the frequency partitions to each cell. Different frequency partitions may be allocated to neighboring cells through the FFR scheme, and the same frequency partition may be allocated to cells far away from each other. Accordingly, inter-cell interference may be reduced, and throughput of the cell edge user equipment may be improved.

Figure 5:
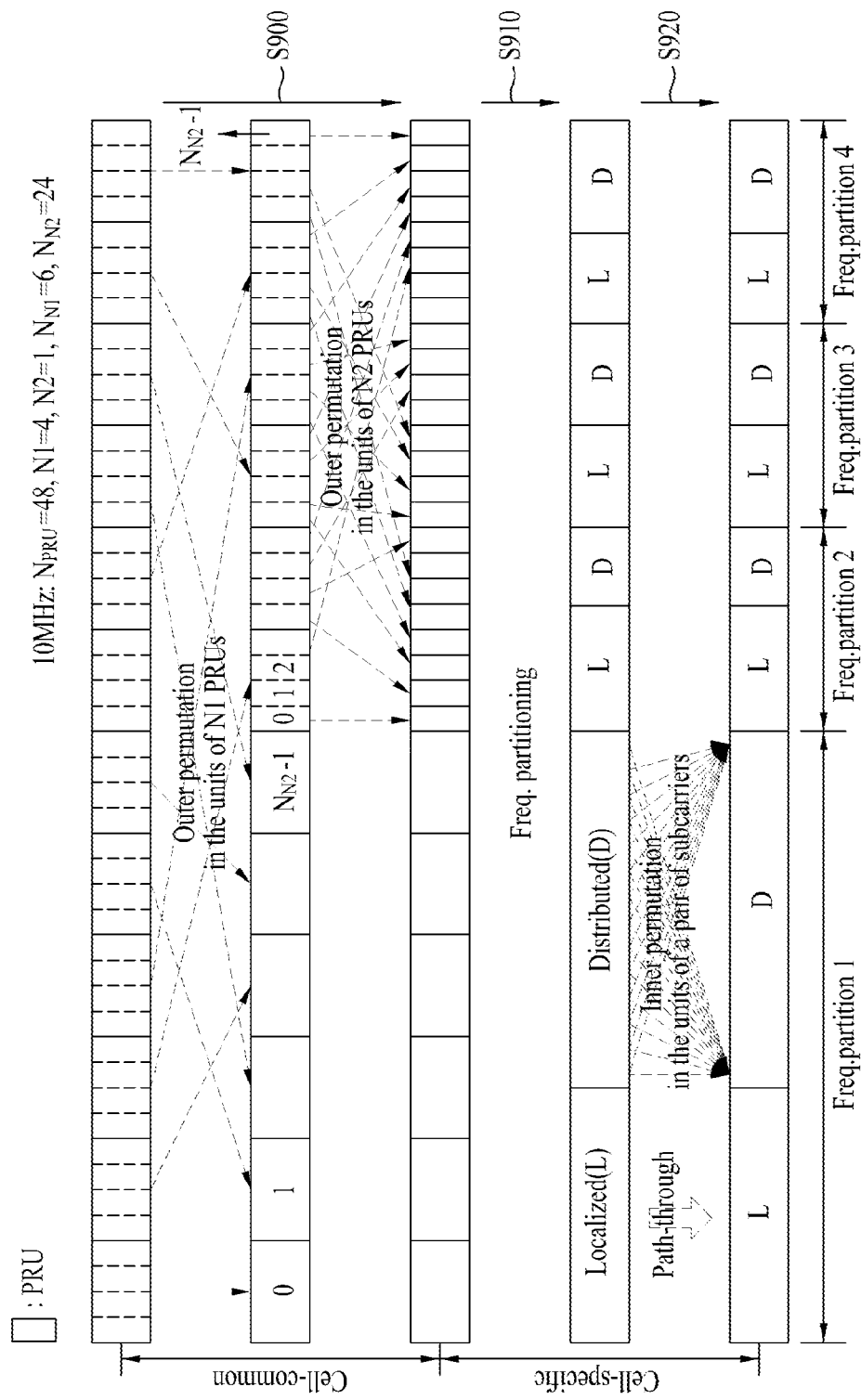
FIG. 5 is a diagram illustrating a subchannelization procedure.

FIG. 5 is a diagram illustrating a subchannelization procedure.

There may be considerations for subchannelization. For example, performance of DRU and CRU, signaling overhead for resource allocation, channel quality indicator (CQI) feedback overhead, flexibility of a ratio between distributive resources and continuous resources, easiness of scaling based on bandwidth (BW), easiness of design for the resource allocation order, easiness of FFR configuration, etc. should be considered for subchannelization. For convenience of description, it is assumed that the entire frequency band is 10 MHz, a total number of PRUs is 48, N1=4, the number NN1 of subbands having granularity of N1 is 6, N2=1, and the number NN2 of minibands having granularity of N2 is 24.

Referring to FIG. 5, PRUs in a physical region are divided into miniband PRUs or subband PRUs, which belong to logical regions, through outer permutation of granularity of N1, and permutation is performed for the miniband PRUs by using granularity of N2 (S500).

The subband PRUs or the miniband PRUs are distributed into each frequency partition, and permutation for dividing continuous resources L from distributive resources D within each frequency partition is performed (S510). The procedure of distributing the subband PRUs or the miniband PRUs into each frequency partition may be included in the procedure of outer permutation of the step S500, or may be performed independently. If the procedure of distributing the subband PRUs or the miniband PRUs into each frequency partition is performed independently, it may be performed on the basis of either frequency partition information broadcasted through the SFH or a separate distributive rule. Inner permutation is additionally performed for the distributive resources to obtain diversity gain (S520).

According to the related art, the base station transmits ranging information on ranging configuration to a plurality of user equipments cell-specifically or sector-specifically, so that the ranging procedure may be performed by the user equipments. Accordingly, in accordance with the development of the communication technology, the number of cells supported by the base station is increased. As the user equipments are increased, a signal use rate used for ranging information transmission is increased, whereby signaling overhead is rapidly increased. Also, a problem may occur in that interference among the user equipments is generated during the ranging procedure.

Accordingly, the present invention is intended to suggest a method for configuring a ranging channel, which can reduce interference generated during a ranging procedure by independently configuring ranging channels allocated to each cell and reduce signaling overhead based on ranging information transmission by configuring the ranging channels in each user equipment by using cell ID.

In more detail, the user equipments according to the embodiment of the present invention may use cell ID as ranging information on ranging channel allocation in a time or frequency domain for configuring the ranging channels from the base station.

Figure 6:
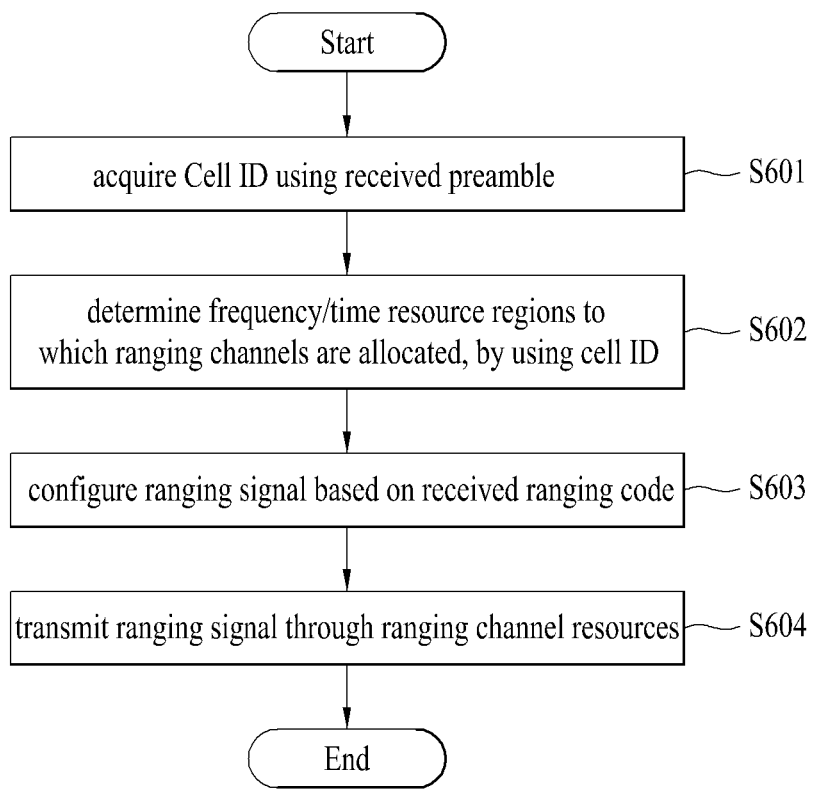
FIG. 6 is a diagram illustrating an example of a procedure of performing a ranging process in a user equipment in accordance with one embodiment of the present invention.

FIG. 6 is a diagram illustrating an example of a procedure of performing a ranging process in a user equipment in accordance with one embodiment of the present invention.

Referring to FIG. 6, the user equipment, which newly enters a cell or is powered on in the cell, acquires cell identification information (cell ID) by using the preamble received from the base station in the cell search procedure (S601).

The user equipment determines ranging channel resources to which a ranging channel is allocated, in accordance with an operation procedure, which is previously set, by using the acquired cell ID (S602). At this time, the ranging channel resources may be allocated to a specific subframe or a specific subband through a separate operation procedure on the time domain and/or the frequency domain.

For example, the user equipment may identify the position of the specific subframe for ranging resource allocation on the time domain by using the cell ID, and may be signaled from the base station ranging information on the position of the specific subband for ranging resource allocation on the frequency domain. At this time, an operation equation for obtaining ranging resources may be implemented in various manners, and the following Equations 1 to 4 may be used.

On the other hand, the user equipment may be signaled from the base station ranging information on the specific subframe for ranging resource allocation, and may identify the position of the specific subband for ranging resource allocation by using the cell ID. In this case, the following Equation 5 may be used.

Alternatively, the user equipment may identify position information on the specific subframe or the specific subband to which resources for ranging channels are allocated on the time domain and the frequency domain, through the cell ID. At this time, an operation equation for obtaining ranging resources may be implemented in various manners, and the following Equations 6 to 9 may be used.

A random one of a total of ranging codes, which are allocated, is selected to configure a ranging signal (S603). The ranging code may include a pseudo random noise (PN) sequence, a constant amplitude zero auto-correlation (CAZAC) based Zadoff-Chu sequence, and a generalized chirp-like (GCL) sequence. In this case, although the ranging code is randomly selected, it may be selected in accordance with a predetermined rule or command.

Afterwards, the user equipment transmits the ranging signal generated at the step S603 by using the subframe to which the ranging channel is allocated (S604).

As described above, the user equipment may configure the ranging channel by using the cell ID without receiving ranging information, which includes frequency resource allocation information and time resource allocation information, from the base station.

Hereinafter, a method for performing ranging channel resource allocation on a time domain and a frequency domain through a user equipment in accordance with one embodiment of the present invention will be described in brief.

1. First Embodiment (Ranging Resource Allocation on Time Domain)

The user equipment according to one embodiment of the present invention may determine subframes allocated as ranging resources on a time domain though cell ID and the number of ranging channels allocated in a unit of subframe.

Figure 7:
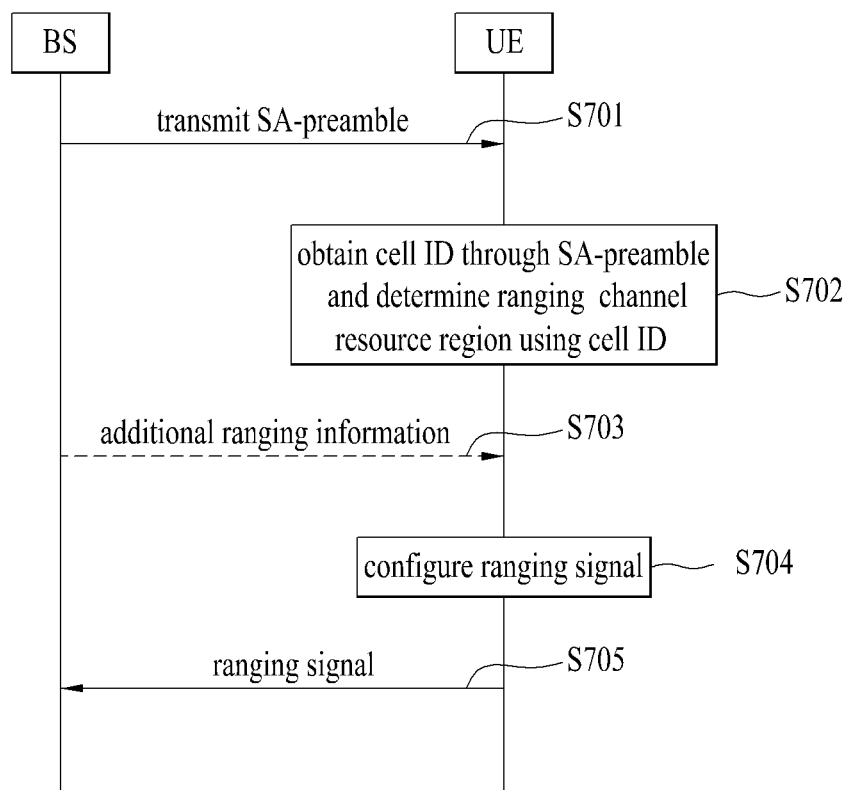
FIG. 7 is a diagram illustrating an example of a procedure of transmitting a ranging channel from a user equipment to a base station in accordance with one embodiment of the present invention.

FIG. 7 is a diagram illustrating an example of a procedure of transmitting a ranging channel from a user equipment to a base station in accordance with one embodiment of the present invention. At this time, it is assumed that a ranging code, which includes a pseudo random noise (PN) sequence, a constant amplitude zero auto-correlation (CAZAC) based Zadoff-Chu sequence, and a generalized chirp-like (GCL) sequence, as described in FIG. 4, is previously allocated to the user equipment.

Referring to FIG. 7, the user equipment, which newly enters a cell or is powered on in the cell, acquires cell identification information (cell ID) by using the preamble received from the base station in the cell search procedure (S701). In more detail, the cell ID may be obtained in accordance with a predetermined rule through segment index. Specifically, the cell ID may be determined using index of a secondary advanced preamble (SA-preamble).

The user equipment that has acquired the cell ID obtains index information on a time resource allocation region to which ranging channels may be allocated, by using an operation equation related to ranging resource allocation, which is previously set (S702).

At this time, if the operation equation which is previously set is related to index of subframe (ISF) to which the ranging channels are allocated, the user equipment does not need to receive separate signaling for ranging channel configuration from the base station.

However, if the operation equation which is previously set is related to frame index (IF) or super frame index (ISuperF) allocated ranging channel resource, information on the subframe to which ranging channels are allocated from the specific frame obtained at the step S702 or the specific super frame may be signaled separately through ranging information (S703). The ranging information may be signaled from the base station through the super frame header (SFH) or may previously be set in the user equipment.

Afterwards, the user equipment selects a random one of allocated ranging codes to configure a ranging signal (S704).

The user equipment transmits the ranging signal configured at the step S704 to the base station on the subframe to which the ranging channels determined through the step S702 and/or the step S703 are allocated (S705).

At the step S702, the user equipment may obtain a specific resource region allocated as a ranging resource through various operation equations which are previously set. Hereinafter, various examples of the operation equations will be described.

The following Equation 1 illustrates an example of an operation equation which is previously set in the user equipment to obtain subframe index on ranging resource allocation.

$$I_{SF} = \mod(f(\text{CellID}), n_{SF} * n_F / N\_RCH) \quad \text{[Equation 1]}$$

In the Equation 1, ISF represents index of subframe, nSF represents the number of super frames constituting one frame, nF represents the number of frames constituting one super frame, and N_RCH represents the number of ranging channels allocated in a unit of super frame. f(CellID) represents a function for ID of a cell where a corresponding user equipment is located. The cell ID corresponding to a parameter may be replaced with another parameter such as base station ID. Mod represents a modulo function, and mod(A, B) means a remaining value obtained by dividing A by B. Hereinafter, the same reference numbers will be used throughout the Equations of the present invention to refer to the same or like parts.

In more detail, ISF represents a specific subframe index of nSF*nF/N_RCH−1 super frames, to which ranging channels are allocated, in accordance with a super frame cycle of 1/N_RCH, and the corresponding subframe may be specified as any one within the range of (0, . . . , nSF*nF/N_RCH−1).

The super frame corresponding to ISF based on the Equation 1 is allocated to the ranging channels per super frame cycle of 1/N_RCH.

For example, in case of nSF=8, nF=4, and N_RCH=⅓, one super frame may include nSF×nF=32 subframes, and three super frames may include a total of 96 subframes. At this time, the user equipment may periodically allocate three super frames (a total of 96 subframes) as ranging channels per the ISFth subframe based on the Equation 1.

In this case, the step S703 of signaling ranging information is omitted in FIG. 7.

In the mean time, the case where the operation equation related to ranging resource allocation, which is previously set in the user equipment, specifies the super frame or frame to which ranging resources are allocated, will be described with reference to Equation 2 to Equation 4.

In accordance with one embodiment of the present invention, the user equipment may use the Equation 2 at the step S702 as a method for performing resource allocation for ranging channels by using cell ID.

The Equation 2 illustrates another example of an operation equation which is previously set in the user equipment to obtain subframe index on ranging resource allocation.

$$I_{SF} = \mod(f(\text{CellID}), n_{SF}) \quad \text{[Equation 2]}$$

The Equation 2 illustrates subframe index ISF for use in ranging resource allocation among nSF−1 subframes within a random frame in accordance with a super frame cycle of 1/N_RCH. According to the Equation 2, the subframe index ISF may be represented by one of (0, . . . , nSF−1), and the ranging channels may be allocated to the ISFth subframe within one frame per super frame cycle of 1/N_RCH.

However, the Equation 2 is applied to a predetermined frame allocated for ranging channels, and ranging information, which includes position information on a specific frame to which the ranging channels are allocated, may be signaled from the base station through the super frame header (SFH) (S703). Alternatively, a predetermined rule for the specific frame to which the ranging channels are allocated may previously be set in the user equipment.

In other words, the user equipment may allocate a specific subframe based on the Equation 2 among a plurality of subframes constituting the specific frame transmitted from the base station as a ranging resource. Accordingly, if the ranging information is signaled, it may be transmitted before the step S702 of performing ranging resource allocation in the user equipment unlike FIG. 5.

Alternatively, the user equipment according to one embodiment of the present invention may use the Equation 3 at the step S702 of performing resource allocation for ranging channels by using cell ID.

The Equation 3 illustrates still another example of an operation equation which is previously set in the user equipment to obtain subframe index on ranging resource allocation.

$$I_F = \mod(f(\text{CellID}), n_F / N\_RCH) \quad \text{[Equation 3]}$$

In the Equation 3, IF represents frame index for ranging resource allocation, and the frame index to which the ranging channels are allocated may be represented by any one of (0, . . . , nF/N_RCH−1). In more detail, IF represents frame index to which the ranging channels are allocated, among nF/N_RCH−1 frames, per super frame cycle of 1/N_RCH. A position of a predetermined subframe for ranging allocation within the IFth frame may previously be set in the user equipment, or may be signaled from the base station through the SFH as separate ranging information (S703).

According to the Equation 3, the ranging channels may periodically be allocated to any one subframe of the IFth frame in a unit of super frame cycle of 1/N_RCH.

Alternatively, the user equipment according to one embodiment of the present invention may use the Equation 4 at the step S704 as a method for performing resource allocation for ranging channels by using cell ID.

The Equation 4 illustrates further still another example of an operation equation which is previously set in the user equipment to obtain subframe index on ranging resource allocation.

$$I_{SuperF} = \mod(f(\text{CellID}), 1/N\_RCH) \quad \text{[Equation 4]}$$

when N_RCH≤1

In the Equation 4, ISuperF represents super frame index for ranging resource allocation, and the super frame index to which the ranging channels are allocated may be represented by one of (0, . . . , 1/N_RCH−1). In more detail, ISuperF represents super frame index allocated for ranging among super frames of 1/N_RCH−1, per super frame cycle of 1/N_RCH.

Information on a position of a predetermined frame and/or subframe where resource allocation is performed within the ISuperFth frame may previously be set in the user equipment, or may be signaled from the base station through the SFH as separate ranging information (S703).

For example, if index of super frame selected for ranging resource allocation is obtained in the same manner as the first UL subframe of the first frame the ISuperFth super frame, it may be determined as the position of the frame and subframe in accordance with a predetermined rule. At this time, the position information on the frame and the position information on the subframe may be divided from each other, and may previously be set in the user equipment or may be transmitted to the user equipment as separate signaling.

According to the Equation 4, the ranging channels may periodically be allocated to any one frame of the ISuperFth super frame and any one subframe of the corresponding frame in a unit of super frame cycle of 1/N_RCH.

2. Second Embodiment (Ranging Resource Allocation on Frequency Domain)

The user equipment according to one embodiment of the present invention may determine subbands allocated as ranging resources on a frequency domain though cell ID.

Accordingly, the same procedure illustrated in FIG. 5 may be applied to this embodiment. However, the step S502 of performing ranging resource allocation on the time domain in the first embodiment may be performed on the frequency domain in this embodiment.

For example, the user equipment according to one embodiment of the present invention may obtain the subbands allocated as ranging resources at the step S702 of ranging resource allocation by using the following Equation 5.

The Equation 5 illustrates an example of an operation equation which is previously set in the user equipment to obtain index information on a specific subband to which the ranging channels are allocated.

$$I_{SB} = \mathrm{mod}(CellID, K_{SB}) \quad \text{[Equation 5]}$$

In the Equation 5, $I_{SB}$ represents index of subband to which the ranging channels are allocated, and $K_{SB}$ represents a total number of subbands to be used by the base station in the corresponding system.

Among a total of KSB subbands $(0, \ldots, KSB-1)$, the user equipment may obtain index information on the specific subband to which the ranging channels are allocated, by using a total number of subbands (KSB) and cell ID without separate signaling.

At this time, the user equipment may receive ranging information, which includes information on a time resource region to which the ranging channels are allocated, from the base station through the SFH. An example of a unit of the time resource region to which the ranging channels are allocated may include subframe, and an example of subframe position information may include an offset value between subframes to which the ranging channels are allocated.

Table 2 illustrates an example of information on the time resource region to which the ranging channels are allocated in accordance with one embodiment of the present invention.

TABLE 2

| Configuration | Cycle of subframe to which channels are allocated |
|---|---|
| 0 | Subframe-offset(OSF)th uplink subframe per frame |
| 1 | Subframe-offset(OSF)th uplink subframe at the first frame per superfame |
| 2 | Subframe-offset(OSF)th uplink subframe at the first frame of the even numbered super frame |
| 3 | Subframe-offset(OSF)th uplink subframe at the first frame of the 4n(integer of n > 0)th super frame |

In other words, the base station may transmit the information on the time resource allocation region, to which the ranging channels are allocated as illustrated in Table 2, to the user equipment through the step S703 of FIG. 5. In this case, the user equipment may use a specific subframe specified in accordance with ranging information within the specific subband determined in the Equation 5 as the ranging channel allocation resource region.

3. Third Embodiment (Ranging Resource Allocation on Frequency Domain)

The user equipment according to one embodiment of the present invention may determine specific resource regions (subframe and subband) allocated as ranging resources on time and frequency domains by using cell ID.

Accordingly, the same procedure illustrated in FIG. 7 may be applied to this embodiment. However, the step S502 of performing ranging resource allocation on the time domain in the first embodiment may be performed as the step of obtaining a specific subframe and a specific subband on the time and frequency domains allocated to the user equipment.

For example, the user equipment according to one embodiment of the present invention may obtain the specific resource regions allocated as ranging resources at the step S702 of ranging resource allocation by using the following Equation 6.

$$I_{idx} = \mathrm{mod}(f(CellID), n_{SF} * n_F/N\_RCH * K_{SB})$$

$$I_{SF} = \lfloor I_{idx}/K_{SB} \rfloor$$

$$I_{SB} = \mathrm{mod}(I_{idx}, K_{SB}) \quad \text{[Equation 6]}$$

In the Equation 6, Iidx represents index of a resource region to which the ranging channels are allocated, and KSB represents a total number of subbands to be used by the base station.

In more detail, index of a specific resource region allocated to the ranging channels, among nSF*nF/N_RCH subframes for KSB subbands, through a super frame cycle of 1/N_RCH, may be represented by any one within the range of $(0, \ldots, nSF*nF/N\_RCH*KSB-1)$. Since a plurality of the user equipments located within a region where the base station provides a service use information on the same number of subbands, the resource regions to which the ranging channels are allocated may be divided in accordance with cell ID of a cell to which each user equipment belongs. Accordingly, inter-cell interference may be reduced during ranging signal transmission.

Index information on specific subframe (ISF) and subband (ISB) allocated as the ranging resources may be obtained by using the number of subbands (KSB) and ranging resource allocation index (Iidx).

In this case, the user equipment may configure the ranging signal, select a random one of subframes of the specific subband determined through the Equation 6 and transmit the selected subframe to the base station without receiving separate ranging information from the base station.

Alternatively, the user equipment according to one embodiment of the present invention may use the following Equation 7 as a method for performing resource allocation for ranging channels.

$$I_{idx} = \mathrm{mod}(f(CellID), n_{SF} * K_{SB})$$

$$I_{SF} = \lfloor I_{idx}/K_{SB} \rfloor$$

$$I_{SB} = \mathrm{mod}(I_{idx}, K_{SB}) \quad \text{[Equation 7]}$$

In the Equation 7, $I_{idx}$ represents ranging channel resource allocation index, especially index of a specific resource region allocated to the ranging channels, among subframes of $n_{SF}$ for $K_{SB}$ subbands, through super frame cycle of 1/N_RCH. In this case, the entire ranging channel resource allocation index set may be represented by $(0, \ldots, n_{SF}*K_{SB}-1)$.

Likewise, index information on specific subframe ($I_{SF}$) and subband ($I_{SB}$) allocated as the ranging resources may be obtained by using the number of subbands ($K_{SB}$) and ranging resource allocation index ($I_{idx}$) based on the Equation 7.

In this case, the position of the frame to which the ranging resources are allocated may previously be set in the user equipment (for example, the first frame of a plurality of frames belonging to the first super frame of the corresponding cycle), or may separately be signaled from the base station through the SFH.

Alternatively, the following Equation 8 may be used as the method for performing resource allocation for the ranging channels by using cell ID in accordance with one embodiment of the present invention.

$$I_{idx} = \mathrm{mod}(f(\mathrm{CellID}), n_F/N\_RCH * K_{SB})$$

$$I_F \lfloor I_{idx}/K_{SB} \rfloor$$

$$I_{SB} = \mathrm{mod}(I_{idx}, K_{SB}) \quad \text{[Equation 8]}$$

In the Equation 8, Iidx represents ranging channel resource allocation index, especially index of a specific resource region allocated to the ranging channels, among frames of nF/N_RCH for KSB subbands, through super frame cycle of 1/N_RCH. In this case, the index of the resource region to which the entire ranging channels are allocated may be represented by any one within the range of $(0, \ldots, nF/N\_RCH*KSB-1)$.

Likewise, index information on specific frame (IF) and subband (ISB) allocated as the ranging resources may be obtained by using the number of subbands (KSB) and the ranging resource allocation index (Iidx) based on the Equation 8.

In this case, the position of the subframe to which the ranging resources are allocated within the IFth frame may previously be set in the user equipment (for example, the first UL subframe of the frame based on the Equation 8), or may separately be signaled from the base station through the SFH.

Alternatively, the following Equation 9 may be used as the method for performing resource allocation for the ranging channels by using cell ID in accordance with one embodiment of the present invention.

$$I_{idx} = \mathrm{mod}(f(\mathrm{CellID}), K_{SB}/N\_RCH)$$

$$I_{SuperF} = \lfloor I_{idx}/K_{SB} \rfloor$$

$$I_{SB} = \mathrm{mod}(I_{idx}, K_{SB}) \quad \text{[Equation 9]}$$

In the Equation 9, Iidx represents ranging channel resource allocation index, especially index of a specific resource region allocated to the ranging channels, among super frames of 1/N_RCH for KSB subbands, through super frame cycle of 1/N_RCH. In this case, the entire ranging channel resource allocation index set may be represented by $(0, \ldots, KSB/N\_RCH-1)$.

Likewise, index information on specific frame (ISuperF) and subband (ISB) allocated as the ranging resources may be obtained by using the number of subbands (KSB) and the ranging resource allocation index (Iidx) based on the Equation 8.

In this case, the position of the frame and subframe to which the ranging resources are allocated within the ISuperFth super frame may previously be set in the user equipment (for example, the first UL subframe of the first frame of the ISuperFth super frame based on the Equation 9), or may separately be signaled from the base station through the SFH. Alternatively, the position information on the frame and subframe may previously be set partially in the user equipment, or may separately be signaled from the base station (S703).

As described above, the user equipment according to one embodiment of the present invention may specifically determine the frequency resource allocation region and the time resource allocation region, to which the ranging channels are allocated, by using the cell ID. In this case, since the user equipment may not receive the ranging information for ranging channel configuration separately from the base station, signaling overhead may be reduced. Also, since a plurality of cell regions where the base station provides a service are respectively identified by their respective cell IDs, the user equipments located within different cells may identify their respective ranging channel resource regions per cell, whereby inter-cell interference may be reduced during ranging signal transmission.

The base station and the user equipment through which the aforementioned embodiments of the present invention can be carried out will be described with reference to FIG. 8.

Figure 8:
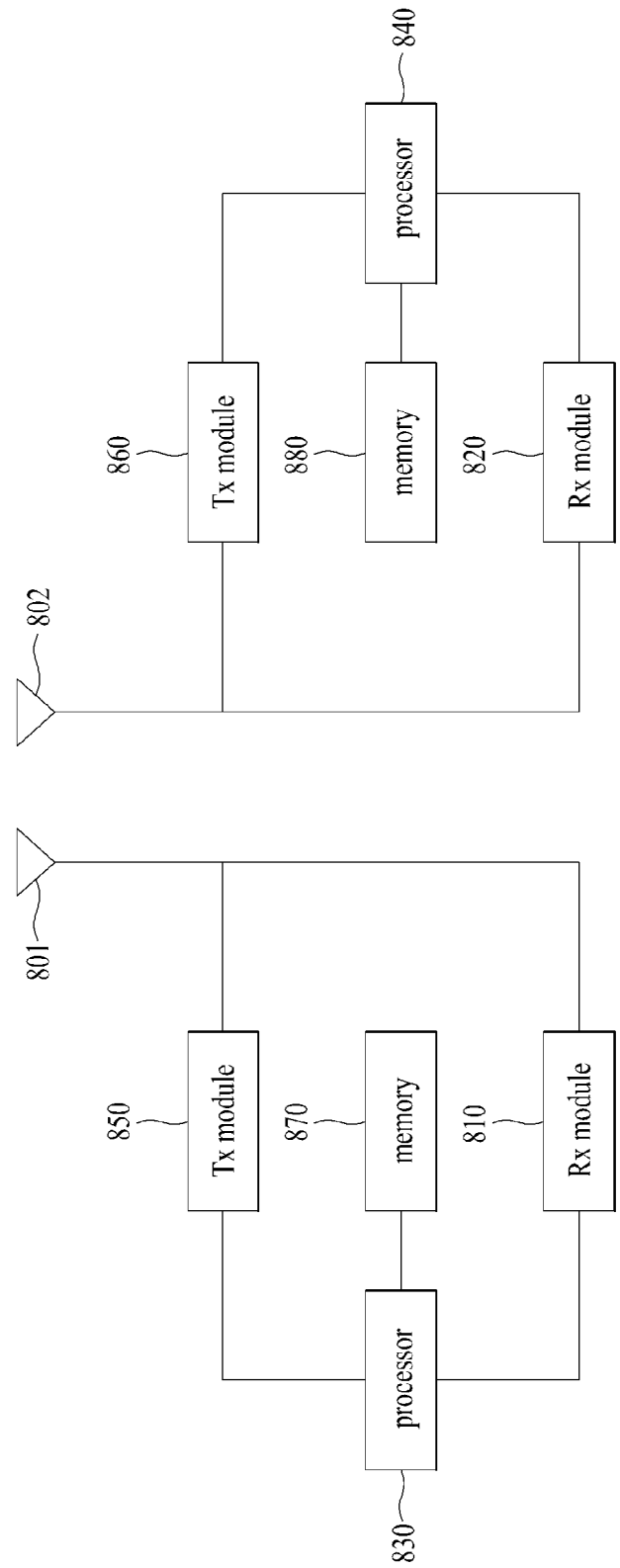
FIG. 8 is a block diagram illustrating a configuration of a user equipment and a base station through which the embodiments of the present invention can be carried out.

FIG. 8 is a block diagram illustrating a configuration of a base station and a user equipment through which the embodiments of the present invention can be carried out.

The user equipment is operated as a transmitting device in an uplink, whereas it is operated as a receiving device in a downlink. Also, the base station is operated as a receiving device in the uplink, whereas it is operated as a transmitting device in the downlink. In other words, each of the user equipment and the base station may include a transmitting device and a receiving device for transmission and reception of information or data.

The transmitting device and the receiving device may include a processor, a module, a part, and/or a means, for which the embodiments of the present invention are carried out. In particular, the transmitting device and the receiving device may include a module (means) for encoding messages, a module for decoding the encoded messages, and an antenna for transmitting and receiving messages.

Referring to FIG. 8, the left side represents a structure of the transmitting device, that is, base station while the right side represents a structure of the receiving device, that is, the user equipment that has entered the cell where the base station provides a service. Each of the transmitting device end and the receiving device may include an antenna 801, 802, a reception (Rx) module 810, 820, a processor 830, 840, a transmission (Tx) module 850, 860, and a memory 870, 880.

Examples of the antenna 801, 802 include a receiving antenna that serves to receive a radio signal from the outside and transfer the radio signal to the Rx module 810, 820, and a transmitting antenna that services to transmit a signal generated by the Tx module 850, 860 to the outside. If a MIMO function is supported, two or more antennas may be provided.

The Rx module 810, 820 may perform decoding and demodulation for the radio signal received from the outside through the antenna to recover original data and then transfer the recovered data to the processor 830, 840. The Rx module and the antenna may be incorporated into a receiving portion for receiving the radio signal unlike FIG. 8.

The processor 830, 840 generally controls the whole operation of the transmitting device or the receiving device. In particular, the processor 830, 840 may perform a controller function for performing the aforementioned embodiments of the present invention, a medium access control (MAC) frame variable control function based on service characteristics and radio wave condition, a handover function, an authentication and encryption function, etc.

The Tx module 850, 860 may perform predetermined coding and modulation for data, which are scheduled from the processor 830, 840 and then transmitted to the outside, and then may transfer the coded and modulated data to the antenna. The Tx module and the antenna may be incorporated into a transmitting portion for transmitting the radio signal unlike FIG. 8.

The memory 870, 880 may store a program for processing and control of the processor 830, 840, or may perform a function for temporarily storing input/output data (uplink (UL) grant allocated from the base station in case of the user equipment), system information, base station identifier (STID), flow identifier (FID), and action time.

Also, the memory 870, 880 may include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The processor 830 of the transmitting device performs the whole control operation for the base station. Also, the processor 830 of the transmitting device may measure channel quality based on the ranging signal transmitted from the receiving device through the Rx module 810. Moreover, the processor 830 of the transmitting device may compensate for the channel of which quality is distorted by determining whether distortion occurs in channel quality.

The processor 840 of the receiving device also performs the whole control operation for the user equipment.

Also, the processor 840 of the receiving device may perform resource allocation for ranging channel configuration and configure the ranging signal in accordance with the aforementioned embodiments of the present invention described with reference to FIG. 6 and FIG. 7, and then may transmit the ranging signal to the transmitting device through the Tx module 860. For example, the processor 840 of the receiving device may acquire cell identification information to which the receiving device belongs by using the preamble transmitted from the transmitting device, and may determine a resource region to which the ranging channels are allocated by using the acquired cell identification information.

In more detail, index information on the frequency resource region (for example, subband) and/or time resource region (for example, subframe, frame or super frame), to which the ranging channels are allocated, may be obtained by using the operation equations related to ranging channel resource allocation, such as the Equation 1 to the Equation 9 previously set in the processor 840 of the receiving device.

Separately from the above, the processor 840 of the receiving device may configure the ranging channel by using the previously set operation equations and the ranging information related to ranging channel configuration, which is received from the transmitting device through the Rx module 820.

The processor 840 of the receiving device may select any one of ranging codes, which include Pseudo random Noise (PN) sequence, Constant Amplitude Zero Auto-Correlation (CAZAC) based Zadoff-Chu (ZC) sequence, and Generalized Chirp-Like (GCL) sequence, and may configure the selected code as the ranging signal. The ranging signal configured as above is transmitted to the transmitting device through the ranging channel configured in accordance with the embodiments of the present invention.

The processor 830 of the transmitting device, which has received the ranging signal, may measure channel quality based on the received ranging signal.

In the mean time, the base station may perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or may further include a separate means, module, or part for performing the aforementioned functions.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

The present invention may be applied to the mobile communication system. In detail, the present invention may be applied to the mobile communication system that supports a Time Division Duplex (TDD) mode, a full-frequency division duplex (F-FDD) mode or a half-frequency division duplex (H-FDD) mode. In more detail, the present invention may be applied to a method for uplink-transmitting control information in a mobile communication system.

The invention claimed is:

1. A method for transmitting a ranging signal at a user equipment in a wireless communication system, the method comprising:

acquiring cell identification information by using a preamble received from a base station;

determining time resource allocation information by using the cell identification information, information on the number of ranging channels allocated per subframe, and information on the number of time resource units of at least one of super frame, frame, and subframe;

determining frequency resource allocation information by using the cell identification information and information on the number of allocated subbands; and transmitting a ranging signal by using a subband indicated by the frequency resource allocation information in a subframe indicated by the time resource allocation information, wherein the time resource allocation information comprises an index of the subframe for transmitting the ranging signal, and wherein the index of the subframe is determined using the following Equation:

$$I_{SF} = \mathrm{mod}(f(\mathrm{CellID}), n_{SF} * n_F / N\_RCH)$$

in the above Equation, $I_{SF}$ represents the index of the subframe to which ranging channel resources are allocated, CellID represents identification information of a cell to which the user equipment belongs, $n_{SF}$ represents the number of subframes constituting one frame, $n_F$ represents the number of frames constituting one super frame, N_RCH represents the number of ranging channels allocated per subframe, and mod(A, B) represents a modulo function that means a remainder obtained by dividing A by B.

2. The method according to claim 1, wherein the frequency resource allocation information comprises an index of the subband used for transmission of the ranging signal.

3. The method according to claim 2, wherein the index of the subband is determined using the following Equation:

$$I_{SB}=\text{mod}(\text{CellID}, K_{SB}),$$

in the above Equation, $I_{SB}$ represents the index of the subband to which a ranging channel resource is allocated, CellID represents identification information of a cell to which the user equipment belongs, and $K_{SB}$ represents a total number of subbands allocated to the user equipment, and mod (A, B) represents a modulo function that means a remainder obtained by dividing A by B.

4. The method according to claim 1, further comprising receiving information on the subframe for transmitting the ranging signal from the base station via a super frame header.

5. A user equipment in a wireless communication system, the user equipment comprising:
a Tx module for transmitting a radio signal;
an Rx module for receiving the radio signal; and
a processor configured to:
acquire cell identification information by using a preamble received from a base station through the Rx module,
determine time resource allocation information by using the cell identification information, information on the number of ranging channels allocated per subframe, and information on the number of time resource units of at least one of super frame, frame, and subframe,
determine frequency resource allocation information by using the cell identification information and information on the number of allocated subbands, and
transmit a ranging signal by using a subband indicated by the frequency resource allocation information in a subframe indicated by the time resource allocation information through the Tx module,
wherein the time resource allocation information comprises an index of the subframe for transmitting the ranging signal, and
wherein the index of the subframe is determined using the following Equation:

$$I_{SF}=\text{mod}(f(\text{CellID}), n_{SF}*n_F/N\_RCH)$$

in the above Equation, $I_{SF}$ represents the index of the subframe to which ranging channel resources are allocated, CellID represents identification information of a cell to which the user equipment belongs, $n_{SF}$ represents the number of subframes constituting one frame, $n_F$ represents the number of frames constituting one super frame, N_RCH represents the number of ranging channels allocated per subframe, and mod(A, B) represents a modulo function that means a remainder obtained by dividing A by B.

6. The user equipment according to claim 5, wherein the frequency resource allocation information comprises an index of the subband used for transmission of the ranging signal.

7. The user equipment according to claim 6, wherein the index of the subband is determined by using the following Equation:

$$I_{SB}=\text{mod}(\text{CellID}, K_{SB})$$

in the above Equation, $I_{SB}$ represents the index of the subband to which a ranging channel resource is allocated, CellID represents identification information of a cell to which the user equipment belongs, $K_{SB}$ represents a total number of subbands allocated to the user equipment, and mod (A, B) represents a modulo function that means the remainder obtained by dividing A by B.

8. The user equipment according to claim 5, wherein the processor is further configured to receive information on the subframe for transmitting the ranging signal via a super frame header from the base station through the Rx module.

* * * * *